Feb. 19, 1952  E. R. DUDLEY, JR  2,586,523
CAN UNSCRAMBLER
Filed Sept. 13, 1948  4 Sheets-Sheet 1
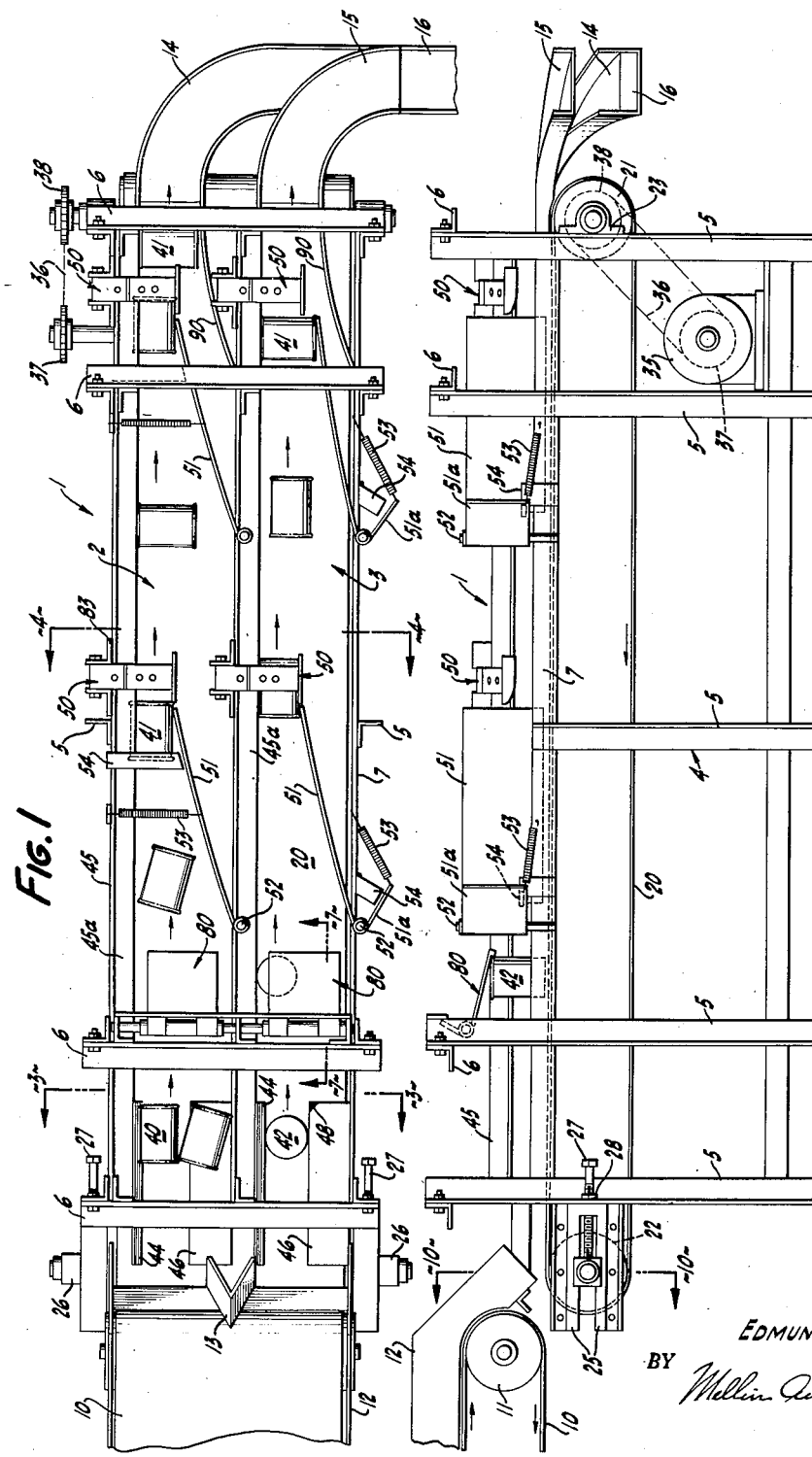
INVENTOR.
EDMUND R. DUDLEY, JR.
BY
ATTORNEYS Feb. 19, 1952     E. R. DUDLEY, JR     2,586,523
CAN UNSCRAMBLER Filed Sept. 13, 1948     4 Sheets—Sheet 2

INVENTOR.
EDMUND R. DUDLEY, JR.
BY
ATTORNEYS

Feb. 19, 1952     E. R. DUDLEY, JR     2,586,523
CAN UNSCRAMBLER
Filed Sept. 13, 1948     4 Sheets-Sheet 3
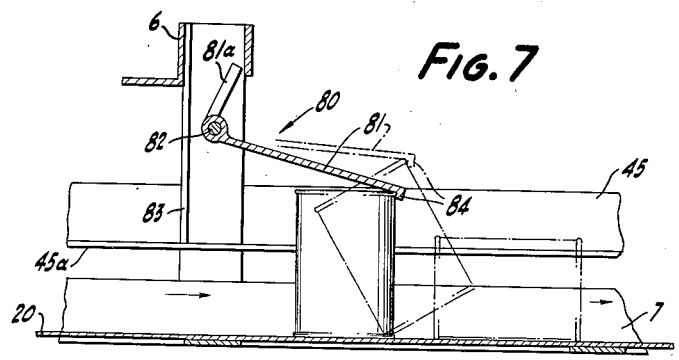
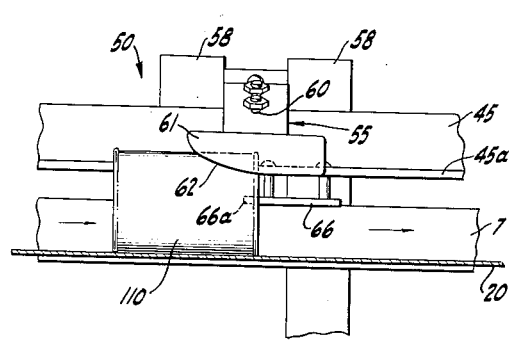
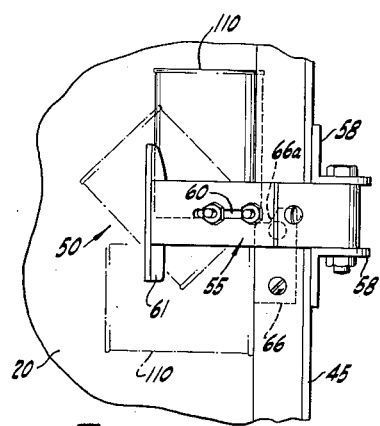
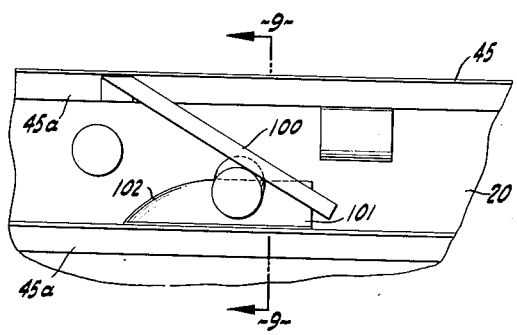
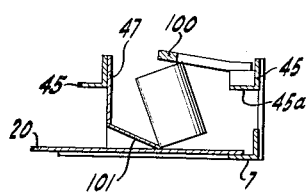
INVENTOR.
EDMUND R. DUDLEY, JR.
BY
ATTORNEYS Feb. 19, 1952  E. R. DUDLEY, JR  2,586,523
CAN UNSCRAMBLER
Filed Sept. 13, 1948  4 Sheets-Sheet 4
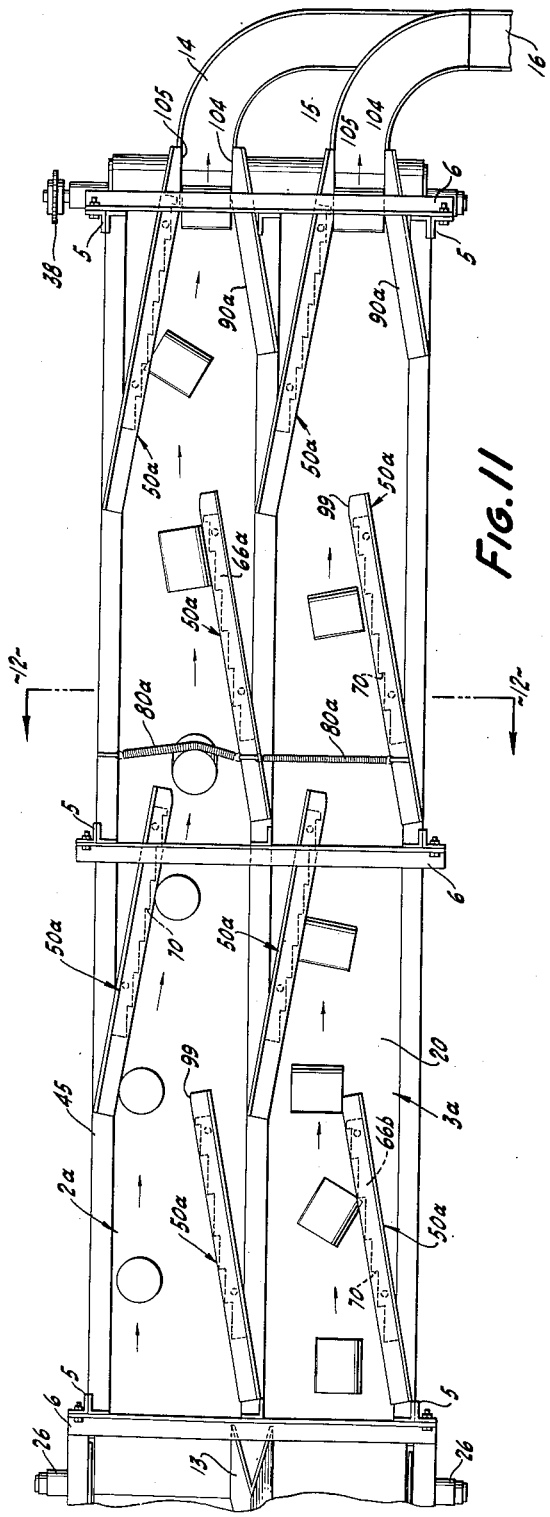
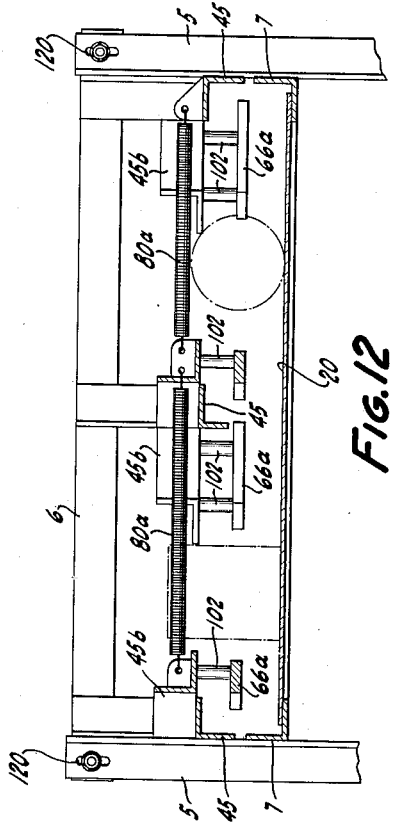
INVENTOR.
EDMUND R. DUDLEY, JR.
BY
ATTORNEYS Patented Feb. 19, 1952

2,586,523

UNITED STATES PATENT OFFICE 2,586,523

CAN UNSCRAMBLER

Edmond R. Dudley, Jr., San Jose, Calif.

Application September 13, 1948, Serial No. 49,053

8 Claims. (Cl. 198—30)

This invention relates to a machine for unscrambling or aligning cans; that is, for receiving cans at a loading station in a condition of random orientation and delivering them at a delivery station in predetermined, aligned position.

In canneries, it is a common practice to cook a mass of unlabeled cans containing food, and thereafter to store, pack or label the cans. In such case, and after the cooking has been completed, it is necessary to align the cans in predetermined position; for example, standing on end or lying on their sides with their axes parallel.

Manual alignment of a mass of cans is time consuming and expensive. Machines heretofore in use to accomplish this have been inefficient or expensive and frequently undependable in their operation, requiring continual adjustment or even shutdown for major repairs.

It is an object of the present invention to provide an improved machine for receiving a mass of cans at a loading station in a condition of random orientation and to deliver them at a removal station in predetermined, aligned position.

It is a further object of the invention to provide a machine which will receive cans in a condition of random orientation and align them on their sides with their longitudinal axes parallel.

It is a still further object of the invention to provide a machine for orienting or aligning cans, which is dependable and continuous in its operation, and which involves a minimum of moving mechanical parts which are likely to require frequent repair or replacement.

These and other objects of the invention will be apparent from the ensuing description and the appended claims.

The invention will be better understood by reference to the accompanying drawings.

In the drawings:

Fig. 1 is a top plan view of one embodiment of the invention.

Fig. 2 is a side elevation of the same.

Figure 4:
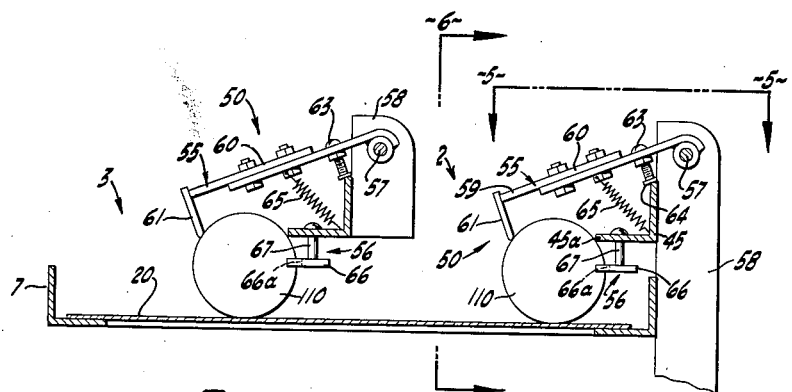
Fig. 4 is a transverse cross section taken along the line 4—4 of Fig. 1, showing the can turning element employed to rotate the cans so as to align them with their axes transverse to the path of travel.

Figs. 5 and 6 are fragmentary sections, taken along the lines 5—5 and 6—6, respectively, of Fig. 4, showing details of the construction of the can turning element and showing the same in elevation and in plan view, respectively.

Fig. 7 is an enlarged fragmentary section taken along the line 7—7 of Fig. 1, showing the can upsetting element used for upsetting cans standing on end.

Fig. 8 is a fragmentary plan view of an alternative form of can upsetting element.

Fig. 9 is a transverse section of the same taken along the line 9—9 of Fig. 8.

Figure 10:
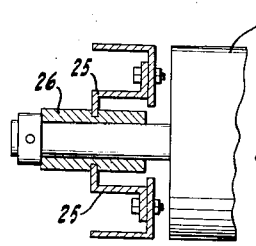

Fig. 10 is an enlarged fragmentary section taken along the line 10—10 of Fig. 2, showing the means of slackening or tightening the belt conveyor.

Fig. 11 is a plan view of a second form of can unscrambling machine.

Fig. 12 is a transverse cross section taken along the line 12—12 of Fig. 11.

Referring now to the drawings, and more particularly to Figs. 1 and 2, the machine 1, as shown, comprises duplicate can unscrambling elements 2 and 3. Support is provided by a framework 4, comprising a plurality of spaced pairs of upright angle beams 5, each such pair of beams being bolted at their upper ends to a transverse angle beam 6. The supporting framework also comprises longitudinal angle beams 7, shown more clearly in Figs. 6 and 7, running the length of the machine on each side thereof and bolted to the upright beams. These longitudinal beams also serve as side guards.

At the left or loading end of the machine there is shown a conveyor belt 10 trained over a roller 11. The conveyor belt 10 delivers scrambled cans to the machine, guard rails 12 being provided to prevent cans falling from the conveyor, and a V-shaped guide member 13 also being provided to proportion the supply of cans more or less equally to the duplicate elements 2 and 3. At the opposite or delivery end of the machine there are shown two delivery or exit ramps 14 and 15 communicating with a common chute 16 down which the cans travel in properly oriented position.

The principal positively driven element of the machine, which conveys the cans from the loading end to the delivery end thereof, is a single conveyor belt 20 trained about rollers 21 and 22. The forward roller 21 is rotatably supported in bearings 23 bolted to the main framework. The rearward roller 22, as shown in Figs. 2 and 10, is adjustable lengthwise of the machine, to take up slack or to accommodate conveyor belts of different lengths, by means of tracks 25 bolted to the framework and which engage and support bushings 26. Adjustment is effected by means of screws 27 and lock nuts 28. The machine is driven by a motor 35 through a chain 36 trained about sprockets 37 and 38.

As the cans delivered to the conveyor belt 20 are carried along the path of travel, they encounter in succession several can orienting elements now to be described. These elements perform the functions of unhooking those cans which are hooked together rim to rim (as at 40), rotate the cans (as at 41) to align them with their longitudinal axes transverse to the path of travel, and upset those cans which are on end (as at 42).

Figure 3:
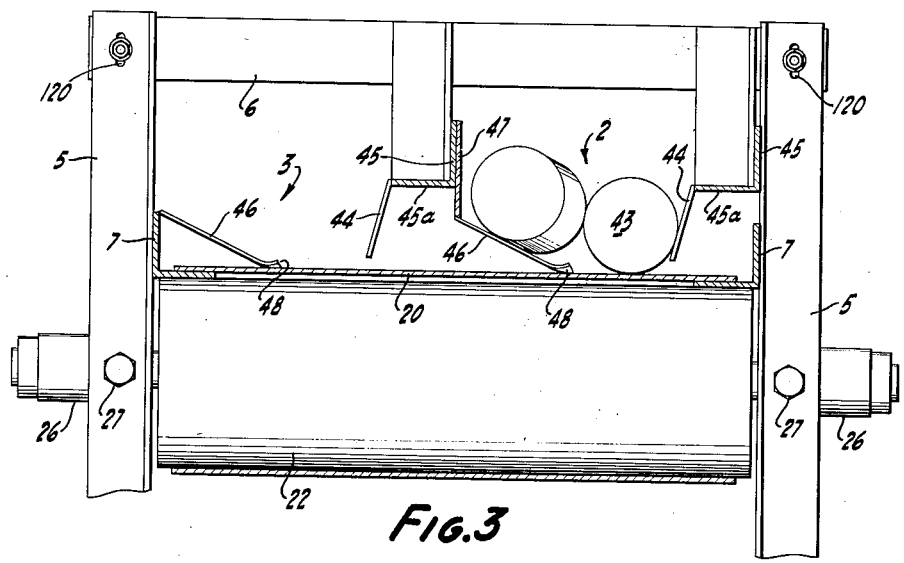
Fig. 3 is a transverse cross section taken along the line 3—3 of Fig. 1, showing the can unhooking element for disengaging cans which are hooked rim-to-rim.

Referring now more particularly to Figs. 1 and 3, and regarding only the right hand side of the machine as viewed in Fig. 3, a can unhooking element is provided at 43. This element comprises a slanting, deflecting plate 44 secured to and depending from an angle-beam 45 bolted to the framework and running the length of the machine, and a can turning plate 46 secured to and depending from a plate 47 bolted to the framework. The turning plate 46 slants downwardly and inwardly to the conveyor belt 20, and it is provided with an upturned forward corner 48.

It will be seen that, when two hooked cans, as illustrated at 40, pass between the deflecting plate 44 and the turning plate 46, one of the cans will be forced upwardly on the turning plate, will be rotated somewhat about its long axis, and will be given a final twist or wrench by the upturned corner 48. The cans are thus effectively unhooked, and the can on the turning plate 46 will simply roll down onto the conveyor belt and continue its course thereon.

Forwardly of the can unhooking element, there is provided a can turning element 50. In advance of this element, and for the purpose of guiding cans toward the turning element, there is also provided a yieldable guide member 51 pivoted at 52 and urged toward the outside of the machine by a spring 53 secured at one end to the beam 45 and at its opposite end to the guide member 51. A stop member 54 to limit pivotal movement of the guide member 51 is secured to and extends inwardly from the beam 45.

The can turning element 50, as shown more clearly in Figs. 4, 5 and 6, comprises a can guide 55 and a can hooking element 56. The guide 55 is pivotally supported at 57 between vertical angles 58 and it comprises an arm 59 formed in two parts, as shown, so as to be adjustable in length at 60, and a cam 61 secured to the free end of the arm. The leading end of the cam 61 is curved at 62 as shown. An adjustable stop screw 63 and a stop 64 are also provided to determine the minimum height of the cam 61, and a coil spring 65 is provided to hold the arm 59 yieldably at such height. The can hooking element 56 comprises a bar 66 having a recess at 66a and supported by bolts 67 which are supported by and depend from the base 45a of the beam 45. The base 45a serves also as, and is referred to hereinafter as, a can gauging rail.

In operation, as cans are conveyed by the belt 20 toward the can turning element 50 and are deflected toward the element 50 by the guide member 51, those cans which are aligned transversely of the line of travel will continue in such manner undisturbed, whereas cans which are aligned parallel to the line of travel will be turned 90°. It will be noted that the gauging rail 45a is at a height above the conveyor belt 20 which is greater than the radius but less than the diameter of a can 110, and that the bar 66 is disposed below the rail 45a and its inner edge does not extend beyond the inner edge of the rail 45a. Thus, if an end of a can abuts the rail 45a, it cannot engage the bar 66 and, therefore, will not be turned. If, however, the side of a can abuts the rail 45a, it will engage the bar 66 and will be turned.

The cam guide 55 serves several purposes. Thus, the cam 61 guides cans toward the hooking element 56, and by yieldably engaging the cans it dampens any bouncing of cans that may result from collision of the cans with each other and with elements of the machine. The capacity of the machine is greatly increased thereby.

Between the can unhooking element and the can turning element, and as shown most clearly in Figs. 1, 2 and 7, there is provided a can upsetting element 80. The can upsetting element comprises a plate 81 pivoted at one end on a pivot bar 82 secured to brackets 83, which, in turn, are bolted to the framework. The free end of the plate 81 is provided with a downwardly turned hook 84. The plate 81 is so weighted as normally to be in the position shown in full lines in Fig. 7. As there shown, when a can standing on end passes underneath the plate 81, it engages the hook 84 and pivots the plate 81 upwardly. At the position shown in broken lines, the can is tilted and upset so as to lie on its side, as also shown in broken lines. An extension 81a of the plate 81 engages angle beam 6, if necessary, to limit pivotal movement of the plate.

As shown in the drawings, a second guide member 51 and a second can turning element 50 are located forwardly of the first can turning element. These are identical with the similar members of the first can turning element, and their function is to align such cans as may have passed the first turning element 50 without being properly aligned.

A fixed guide member 90 is also provided at the delivery end of the machine opposite the second can turning element 50, to guide the cans into the lower ramp 14.

As will also be apparent, the unscrambling element 3, or the left hand half of the machine as viewed in Figs. 3 and 4, is substantially identical with the element 2 or right-hand half described above, the only substantial difference being that the springs 53 biasing the guide members 51, and the stop members 54, are secured outwardly of the machine, and each guide member 51 is provided with an extension 51a to abut the stop member 54.

Referring now to Figs. 8 and 9, there is shown modified form of can upsetting element. Instead of employing a pivotal upsetting arm or plate provided with a hook, in this modification there is providing a deflecting and upsetting arm 100 secured at one end to the gauging rail 45a and extending diagonally across the path of travel of the cans with a slight upward tilt, as shown. On the opposite side of the path of travel, secured to the beam 47, is a slide member 101 slanting inwardly and downwardly from the beam 47 and having a curved, rearward end 102.

As will be seen, when an upright can reaches the upsetting arm 100, the can is deflected toward the slide 101, is upset and rolls down the slide to continue its travel.

Referring now to Figs. 11 and 12, there is here shown another form of machine, in which like parts are similarly numbered. As will be seen, along each of the can unscrambling elements 2a and 3a, there is provided a plurality of staggered can turning elements 50a, each being secured to the angle beam 45 (which may be inverted, as shown), and extending diagonally over the path of travel of the cans. Each such can turning member comprises a gauging member 45b in the form of a short angle section, and as in the case of the gauging rail 45a in the embodiment described above, the member 45b is at a height above the conveyor belt 20, which is less than the diameter but greater than the radius of the can. Each gauging member 45b is provided with a tapered section 99 at its forward, inner edge to assist in guiding the cans. Suspended from the underside of each member 45b by means of the pins 102 is a hooking member 66b provided with a serrated edge defined by teeth 70. The hooking member 66b, as in the case of the bar 66 in the above-described embodiment, is so disposed as to engage the rims of the cans as they progress along the path of travel.

As shown, this embodiment is also provided with a can upsetting spring 80a positioned across each unscrambling element, and secured at opposite sides thereof. The spring 80a on contacting an upright can, will yield until the tension is sufficient to tilt and upset the can. This embodiment is also provided with a diagonal guide member 90a at the delivery end of the machine, having a tapered end portion 104 matching a similar tapered end portion 105 of the opposite gauging member 45b. By this means, each can is given a final orientation and is properly aligned for delivery to the exit ramp.

As shown in Figs. 3 and 12, the transverse beams 6 are adjustably bolted at 120 to the upright beams 5. Thus, means are provided for adjusting the height of the can turning elements 50 and 50a, and of other elements, above the conveyor belt 20, and thereby adjusting the machine to cans of different dimensions.

It is thus apparent that a can unscrambling machine, including diverse embodiments of the same, has been provided which is simple in design and operation and which effectively receives a mass of scrambled cans and performs a series of operations thereon, including unhooking upsetting and turning, so as to deliver the cans in properly aligned position at the delivery end of the machine. The machine, and particularly the first embodiment illustrated in Figs. 1 and 2, is capable of unscrambling or orienting cans at very high speed.

While I have shown the preferred form of my invention, it is to be understood that various changes may be made in its construction by those skilled in the art without departing from the spirit of the invention as defined in the appended claims.

I claim:

1. A can aligning machine comprising means for conveying cans from a loading station to a delivery station and defining a path of travel, a can gauging member disposed above said path of travel at a height greater than the can radius and less than the can diameter, and a can turning member disposed beneath said gauging member and above said path of travel, said turning member extending over said path of travel a distance sufficient to engage the rim of a can parallel to and abutting said gauging member and to turn the can.

2. A can aligning machine comprising means for conveying cans from a loading station to a delivery station and defining a path of travel, can gauging and turning means disposed above said path of travel and a can guide so disposed as to allow uninterrupted passage of cans aligned transversely to the path of travel but to urge cans parallel to said path of travel toward said can gauging and turning means.

3. A can aligning machine comprising means for conveying cans from a loading station to a delivery station and defining a path of travel, can gauging and turning means disposed above said path of travel and can guide means pivotally supported and resiliently urged in a downward direction, said can guide means being so disposed as to allow uninterrupted passage of cans aligned transversely to the path of travel but to urge cans parallel to said path of travel toward said can gauging and turning means.

4. A can aligning machine comprising means for conveying cans from a loading station to a delivery station and defining a path of travel, can gauging and turning means operable to pass cans aligned transversely to said path of travel and to turn cans parallel thereto, and a cam member disposed at a height above said path of travel and at a distance from said can gauging and turning means such as to contact a parallel can and urge the same toward said gauging and turning means, said cam member being pivotally supported to allow uninterrupted passage of transverse cans.

5. A can aligning machine comprising means for conveying cans from a loading station to a delivery station and defining a path of travel, can gauging and turning means operable to pass cans aligned transversely to said path of travel and to turn cans parallel thereto, and a cam member disposed at a height above said path of travel and at a distance from said can gauging and turning means such as to contact a parallel can and urge the same toward said gauging and turning means, said cam member having a downwardly and rearwardly curved leading edge, being pivotally supported to allow uninterrupted passage of transverse cans and being resiliently urged in a downward direction.

6. In a can aligning machine comprising a can conveyor and can gauging and turning means adapted to pass cans aligned transversely to said conveyor and to turn cans parallel thereto, the improvement which comprises a can guide comprising an arm, means for adjusting the length of said arm, means pivotally mounting said arm above said gauging and turning means and transversely to said conveyor and with an end of the arm disposed above said conveyor, resilient means urging said end downwardly and a cam member secured to said end, said cam member being curved downwardly and rearwardly from its leading end.

7. A can aligning machine comprising an endless conveyor for conveying cans from a loading station to a delivery station and defining a path of travel, means for deflecting cans to one side of said path of travel, and can turning means disposed along said side and operable to turn cans aligned parallel to said path of travel and to allow uninterrupted passage of cans transverse to said path of travel.

8. A can aligning machine comprising means for receiving cans at a loading station and propelling them to a delivery station, said means defining a path of travel for the cans; a plurality of can aligning members, each comprising a can gauging member disposed above and diagonally of said path of travel at a height less than the can diameter, the said can aligning members being disposed in staggered relation along said path of travel to impart to the cans a tortuous course; each can aligning member also comprising a can hooking and turning member disposed underneath the can gauging member and adapted to hook the rim of a can abutting and parallel to the gauging member.

EDMOND R. DUDLEY, Jr.

REFERENCES CITED

The following references are of record in the file of this patent:

UNITED STATES PATENTS

| Number | Name | Date |
| --- | --- | --- |
| 1,028,766 | Montgomery | June 4, 1912 |
| 1,277,782 | Tucker | Sept. 3, 1918 |
| 1,389,794 | Thiele | Sept. 6, 1921 |
| 1,445,899 | McGregor | Feb. 20, 1923 |
| 1,495,610 | Paridon | May 27, 1924 |
| 1,765,419 | Goss | June 24, 1930 |
| 1,865,086 | Cutler | June 28, 1932 |
| 2,324,246 | Thompson | July 13, 1943 |
| 2,392,509 | Sells | Jan. 8, 1946 |